May 27, 1924.

J. J. REILLY ET AL 1,495,234

MACHINE FOR MAKING NUT BLANKS

Original Filed May 22, 1919    3 Sheets-Sheet 2

John J. Reilly
Sylvester W. Reilly
INVENTOR.

BY

Edwin P. Corbett
ATTORNEY.

May 27, 1924.  1,495,234

J. J. REILLY ET AL

MACHINE FOR MAKING NUT BLANKS

Original Filed May 22, 1919  3 Sheets-Sheet 3

John J. Reilly
Sylvester W. Reilly
INVENTOR.

BY Edwin P. Corbett ATTORNEY.

Patented May 27, 1924.

UNITED STATES PATENT OFFICE.

1,495,234

JOHN J. REILLY AND SYLVESTER W. REILLY, OF COLUMBUS, OHIO.

MACHINE FOR MAKING NUT BLANKS.

Original application filed May 22, 1919, Serial No. 298,906. Divided and this application filed October 11, 1920. Serial No. 416,099.

*To all whom it may concern:*

Be it known that we, JOHN J. REILLY and SYLVESTER W. REILLY, citizens of the United States of America, residing at Columbus, in the county of Franklin and State of Ohio, have invented certain new and useful Improvements in Machines for Making Nut Blanks, of which the following is a specification.

Our invention relates to machines for making nut-blanks and is particularly applicable to automatic machines of this type wherein the stock in the form of a bar of hexagonal or other shape is automatically fed by a step-by-step movement to cutting and drilling mechanism which cutting and drilling mechanism is so coordinated as to sever a drilled nut-blank of the proper formation and size with a minimum loss of time. Our invention is particularly applicable to a type of machine wherein the automatically fed stock is operated upon by a cutting tool which reciprocates in a path transverse to the line of feed of the drill while the drill operates axially upon the stock, the cutting and drilling action taking place at the same time but the drill being withdrawn just before the cutting action is completed. This is a division of our application filed May 22, 1919, Serial No. 298,906.

One of the objects of our invention is to provide a structure wherein the cutting and chamfering or forming of the nut-blanks is accomplished by a single tool. Another object of our invention is the provision of a novel form of drill mechanism in that the drill is mounted in a guide which rotates therewith, thus eliminating the friction which inevitably occurs in relatively stationary guides and providing a relatively long bracing member for the drill. This structure of drill guide is such that the drill is rigidly braced against any wabbling action and since it revolves with this guide all danger of wearing away the clearance of the drill is obviated.

Another object of our invention consists in the provision of a stock feeding and gripping mechanism wherein the chuck is held in clamping relation upon the stock by a spring but is releasable at given intervals by a positively driven mechanism without interfering with the rotation of the stock, mechanism being provided whereby during this period of release the stock is fed forward in a manner that will be understood as this description progresses.

A further important feature of our invention has to do with the provision of a mechanism whereby the stock may be fed through the machine continuously and without the necessity of stopping the machine for the removal of short bars. Our invention is such that a new bar of stock may follow the bar that has been practically worked out and will serve to feed the partially worked out bar while at the same time being itself fed and positively held against return movement as the feeding mechanism assumes various positions.

Other features of importance in our invention will appear in the following description wherein reference will be made to the accompanying drawings in which similar characters of reference designate corresponding parts and wherein.

Figure 1:
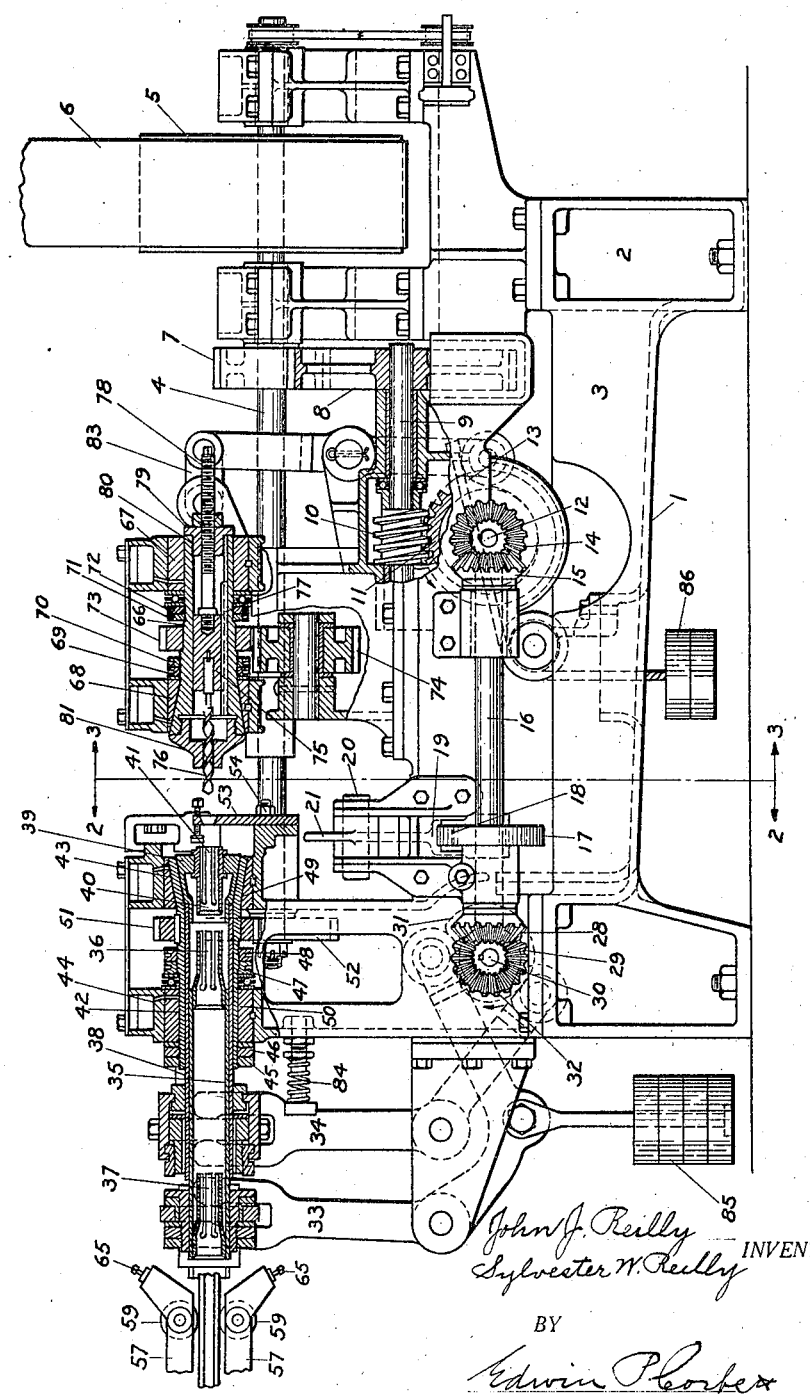
Figure 1 is a side elevation of our improved apparatus, certain portions thereof being shown in sections.
Figure 2:
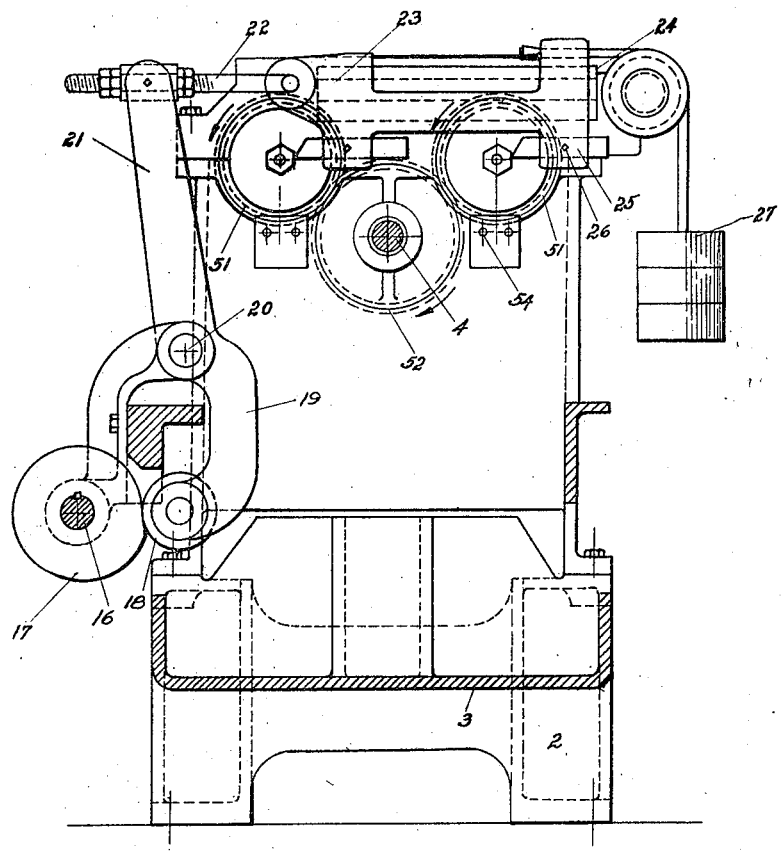
Figure 2 is a vertical section taken on line 2—2 of Figure 1 looking toward the left.
Figure 3:
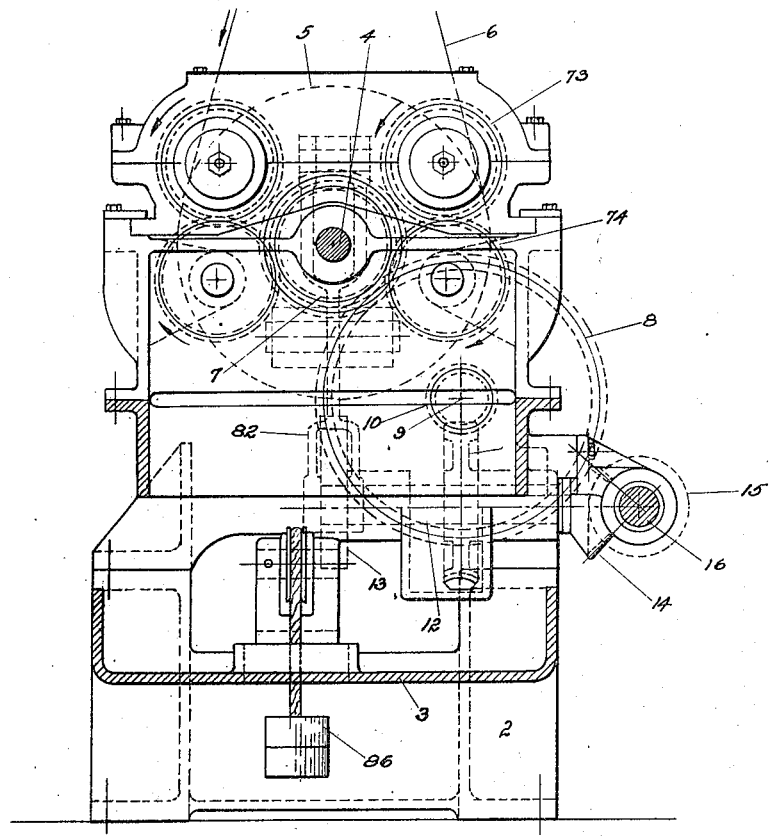
Figure 3 is a section taken on line 3—3 of Figure 1 but looking toward the right of the machine.

In the drawings, our apparatus is shown constructed in multiple units, that is, several sets of feeding, cutting and drilling mechanism are driven through a single driving shaft. However, it will only be necessary to describe one unit. The base of the machine is shown at 1 and is preferably mounted upon legs 2 which desirably have an oil pan 3 formed therewith. The driving shaft of our apparatus is designated 4 and is shown driven by a pulley 5 and belt 6, although other driving mechanism may be utilized. The driving shaft 4 is connected by means of a gear 7 to a gear wheel 8 upon a counter-shaft 9 and this counter-shaft 9 is provided with a worm 10 for coaction with a worm wheel 11 upon a shaft 12. The shaft 12 carries a cam 13 intermediate its ends and upon the near end carries a bevel gear 14 for coaction with the beveled gear 15 upon the shaft 16. This shaft 16 carries a cam 17 designed to cooperate with a roller 18 upon the lower end of a lever 19 which is pivoted at 20. The upper end 21 of this lever has an adjustable threaded connection to a link 22 which is connected pivotally to a tool carriage 23. This tool carriage 23 rides upon a track 24 and is provided with one or more sockets 25 in which the cutting and chamfering or forming tool is firmly held by means of a set-screw 26. The carriage 23 is normally held out of operative position by the weight 27.

The shaft 16 is provided at its outer end with a bevel gear 28 which meshes with a bevel gear 29 upon a shaft 30 carrying cams 31 and 32. The cam 31 is designed to operate a lever 33 for a purpose to be described. The cam 32 is designed to operate a lever 34 for a purpose which will also be described.

The stock feeding and gripping mechanism of our invention is primarily under the control of levers 33 and 34 and parts complemental thereto. It comprises an inner tube 35 having at its forward end concentrically disposed resilient fingers 36 for gripping the stock. This tube 35 is the tube for feeding the stock and it is provided adjacent its rear end with similar resilient members 37. The tube 35 is reciprocally mounted within a tube 38 which is internally threaded at its forward end for the reception of a chuck member 39. This chuck member 39 is in the form of externally flared jaw-pieces that embrace a short tube 40 having slots therein so as to produce resilient frictional gripping members 41. The gripping elements 36, 37 and 40 are interchangeable in accordance with the dimensions and shape of the materials being fed. Enclosing both the tubes 35 and 38 at their forward ends is a quill 42 which is flared as at 43 but which is permanently mounted upon the base by means of a head piece 44 secured upon the base by bolts. This quill 42 is firmly held in proper position by means of adjustable nuts 45 and 46 which coact with adjusting nuts 47 and 48. The quill is designed to rotate upon bearings 49 and 50 and this rotation is effected by means of a spur gear mounted upon and embracing the quill as at 51, which gear is driven by a gear 52 upon the main shaft 4. A stop 53 is shown just in advance of the chuck, this stop being held in place by removable bolts 54 and being replaceable by stops of any desired thickness for determining the feed of the stock to regulate the thickness of the nut-blanks being made.

Figure 4:
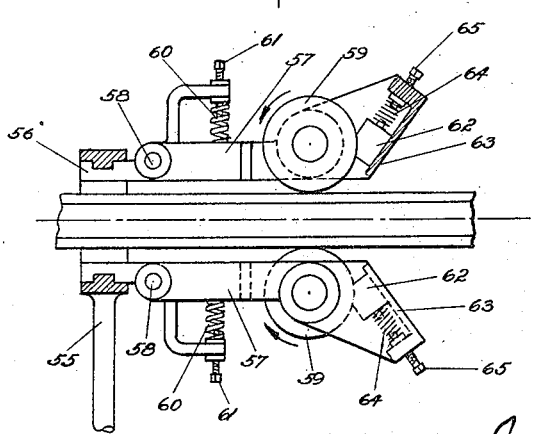
Figure 4 is a detail view illustrating the mechanism which prevents return movement of the stock being fed.

In conjunction with the feeding structure just described, we provide a means through which the stock is fed to the chuck, this means being of such structure that all return movement will be precluded. The mechanism in question may take various forms and we have illustrated one form in Figure 4 of the drawings. In this figure, the framework of the mechanism is shown at 55 and this framework carries a revolvable member 56 upon which are mounted diametrically opposite members 57 pivoted at 58 to the revolvable member 56. The members 57 carry at their free ends rollers 59 designed to contact with the stock being fed therethrough. The pivoted arm-members 57 are normally forced inwardly by means of coil springs 60 adjustably tensioned by set-screw mechanisms 61. The rollers 59 may travel in the direction of the arrows, in Figure 4, but cannot move in the opposite direction because of the action of the friction blocks 62 normally forced inwardly between the rollers 59 and the casings 63 by means of coil springs 64 which are likewise adjustably tensioned by set-screws 65. The structure is such that the bars of stock may be fed from left to right but are incapable of reverse movement due to the frictional contact of the rollers 59 and their controlling devices.

The drill mechanism is mounted opposite to the stock feeding mechanism in such a way that the drill will be in axial alignment with the stock being fed. This drill mechanism comprises a quill 66 rotatably mounted in bearings 67 and 68 and adjustably locked against longitudinal movement by nuts 69 and 70 and nuts 71 and 72, these nuts serving to take up wear. The quill is likewise provided with a spur gear 73 which cooperates with a broad-faced gear 74. Mounted within the quill 66 we have provided a plunger 75 which has a socket at its forward end so that it may support the drill 76. The plunger 75 is splined to the quill by means of a feather key 77 and carries upon its rear end a threaded bolt 78 which is adjustable in the threaded bore of a cap 79. The cap 79 is shouldered and its reduced portion is threaded as at 80 into the quill 66. The forward end of the quill is internally threaded for the reception of the drill guide 81 and this drill guide is provided with a close fitting bore through which passes the drill 76.

The inner structure just described is movable toward and from the stock by means of the lever 82 through the medium of a link 83. In all positions of movement, the quill is positively rotated by means of the spur gear 73 and the broad-faced gear 74 with the result that both the drill and the drill guide are rotated at the same speed in the same direction. This is ensured by the fact that the drill support and the guide are splined together.

In operation, the stock is fed forwardly by means of the feed tube through the chuck until its end abuts the stop 53. At this time the machine is started and the spring 84 becomes effective to move the tube 38 as far as possible to the left with the result that the chuck firmly grips the stock. The cutter and drill both move simultaneously into the stock. These two operations, however, are so timed that the drilling action is completed and the drill withdrawn just prior to the completion of the cutting and forming operation.

During the cutting operation, the cam 31 actuates the lever 33 to withdraw the feed tube preparatory to the next feeding action, it being understood that the resilient fingers will slip over the stock which is at this time firmly held by the chuck. Immediately after the severing and dropping of the formed and drilled nut-blanks, the chuck is released by the cam 32 acting upon the lever 34 momentarily to overcome the spring 84. Then, while this chuck is in inoperative position, the cam 31 permits the weight 85 to pull the lever 33 upwardly and swing the feed tube to the right. This movement of the feed tube to the right carries the stock forward until it abuts the stop 53 at which time the cam 32 permits the spring 84 to force the lever 34 into a position where the chuck firmly grips the work. If there is a short bar of stock in the feed tube and held by the fingers 36 and the chuck 41, a following bar will be held by the fingers 37 but these fingers 37 will slip upon the stock due to the action of the member 55 upon this additional bar of stock, that is, during the movement of the feed tube to the left. In the movement of the feed tube to the right, however, the bar of stock held in the fingers 37 will be carried forward thereby, being unchecked by the member 55, and will force the forward bar ahead of it.

The drill structure is reciprocated by means of the lever 82, being movable into boring relation to the stock by the cam 13 and being withdrawn therefrom when the cam 13 permits the weight 86 to become effective. It has already been explained that during all of this movement of the drill structure, both the drill and its guide are rotated at the same speed. The extent to which the drill will bore into the stock may be regulated by adjusting the bolt 78 within the cap 79 and it will be obvious that the drill and its supporting plunger may be completely removed by first unscrewing this cap 79.

It will be apparent that our invention may take many different forms and we desire it understood that mere substitution of equivalents and changes of structural detail will not depart from our invention, the principles of which are outlined in the appended claims.

An important feature of our invention arises from the particular form of stock-gripping mechanism. To the best of our knowledge, we are the first to devise a machine that will compensate for normal variation in the stock cross-sections. In other words, in practical experience it frequently occurs that the bars of stock passing through the machine will either be undersize or oversize. With a positive gripping action during drilling, an undersize bar will slip until the machine has been stopped and adjusted. With an oversize bar and a positive gripping action an undue strain will be thrown upon the gripping mechanism. With our device, the resilient gripping action automatically compensates for these variations. This we have found from practice and it is not a matter of theory alone.

Having thus described our invention, what we claim is:

1. A nut-blank making machine comprising a drill, a guide for said drill having a slidable non-rotatable connection therewith and permanently mounted upon the machine, the connection being such that the said drill may be completely withdrawn from said guide rearwardly thereof.

2. A nut blank machine comprising a drill, a guide through which the forward end of the drill extends, a support secured to the rear end of the drill, means for rotating said guide and said support, said last means comprising a pinion mounted upon said guide and a broad faced gear to permit of a rearward and forward adjustment.

3. A nut-blank making machine comprising a rotatable drill, a longitudinally slidable member, a socket therein in which said drill is mounted, and a guide carried by the machine independent of said socket for the forward end of said drill, said guide being relatively immovable in action and means to move said slidable member in either direction to adjust the position of the drill.

4. A nut-blank making machine comprising a rotatable quill with a drill guide at its forward end, a bearing for rotatably supporting said quill on the machine base and a drill member carried in said quill and having a slidable non-rotative connection therewith.

5. A nut-blank making machine comprising a rotatable quill with a drill guide at its forward end, means for permanently supporting said quill in the machine frame, a drill member carried in said quill and withdrawable rearwardly thereof and means for rotating and longitudinally moving said quill and drill member together.

6. A nut-blank making machine comprising a rotatable drill, a socket element in which said drill is mounted, a guide for said drill, said guide being movable with said drill and being supported by means independent of the drill or its socket element and means for adjustably locking said guide against longitudinal movement relative to its supporting means.

7. A nut-blank making machine comprising a rotatable drill, a socket element in which said drill is mounted, and a guide for said drill having a non-rotatable connection therewith, said guide being movable longitudinally with said drill and being supported by means independent of the drill or its socket element.

8. A nut-blank making machine comprising a rotatable quill with a drill guide at its forward end and supported entirely thereby, means for permanently supporting said quill on the machine base, a drill member carried in said quill, means for rotating and longitudinally moving said quill and drill member together, and means for effecting relative adjustment of said quill and drill member independently of any movement of said drill or drill guide.

9. A nut-blank making machine comprising a rotatable drill, a socket element in which said drill is mounted, a guide for the forward end of said drill, said guide being movable with said drill and being supported by means independent of the drill or its socket element and a guide permanently mounted upon the machine for slidably and non-rotatively supporting the rear end of said drill.

10. A nut-blank making machine comprising a drill guide supported on the machine independently of the drill, and a drill, said guide and drill being movable together independently of any action of their adjacent surfaces.

11. A nut-blank making machine comprising a drill guide supported on the machine independently of the drill, and a drill, said guide and drill being movable longitudinally together independently of any action of their adjacent surfaces.

12. A nut-blank making machine comprising a drill guide supported on the machine independently of the drill, and a drill, said guide and drill being movable longitudinally and rotatably together independently of any action of their adjacent surfaces.

In testimony whereof we hereby affix our signatures.

JNO. J. REILLY.
SYLVESTER W. REILLY.

Certificate of Correction.

It is hereby certified that in Letters Patent No. 1,495,234, granted May 27, 1924, upon the application of John J. Reilly and Sylvester W. Reilly, of Columbus, Ohio, for an improvement in "Machines for Making Nut Blanks," an error appears in the printed specification requiring correction as follows: Page 4, strike out line 31 and insert instead the syllable and words *chine independently of the drill, and a drill,;* and that the said Letters Patent should be read with this correction therein that the same may conform to the record of the case in the Patent Office.

Signed and sealed this 5th day of August, A. D. 1924.

[SEAL.]

WM. A. KINNAN,
*Acting Commissioner of Patents.*